US006965669B2

(12) United States Patent
Bickford et al.

(10) Patent No.: US 6,965,669 B2
(45) Date of Patent: Nov. 15, 2005

(54) METHOD FOR PROCESSING CALLS IN A CALL CENTER WITH AUTOMATIC ANSWERING

(75) Inventors: John Holden Bickford, Hyde Park, NY (US); Christopher Ryan Groves, Cary, NC (US); Kevin James Muterspaugh, Harvest, AL (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 10/282,436

(22) Filed: Oct. 29, 2002

(65) Prior Publication Data

US 2004/0081309 A1 Apr. 29, 2004

(51) Int. Cl.[7] ........................... H04M 1/64; H04M 3/00
(52) U.S. Cl. ............................ 379/265.07; 379/88.01; 379/266.01
(58) Field of Search ...................... 379/265.01, 265.02, 379/265.07, 265.11, 266.01, 88.01

(56) References Cited

U.S. PATENT DOCUMENTS 4,626,904 A * 12/1986 Lurie .......................... 725/10
4,763,353 A * 8/1988 Canale et al. ............... 379/157
5,226,077 A * 7/1993 Lynn et al. ................. 379/395
5,729,600 A * 3/1998 Blaha et al. ........... 379/266.07
6,058,163 A * 5/2000 Pattison et al. ........ 379/265.06
6,330,325 B1 * 12/2001 Reid et al. ............. 379/265.01
6,396,920 B1 * 5/2002 Cox et al. .............. 379/266.02
6,546,097 B1 * 4/2003 Peltz ..................... 379/265.07
6,600,821 B1 * 7/2003 Chan et al. ............ 379/265.07
2001/0024497 A1 * 9/2001 Campbell et al. ...... 379/265.09
2002/0056000 A1 * 5/2002 Coussement ................ 709/225
2003/0165230 A1 * 9/2003 Reuss .................... 379/265.02
2004/0015551 A1 * 1/2004 Thornton .................... 709/204

OTHER PUBLICATIONS

U.S. Appl. No. 60/042,213.*

* cited by examiner

*Primary Examiner*—Benny Tieu
*Assistant Examiner*—Hector A. Agdeppa
(74) *Attorney, Agent, or Firm*—Arthur J. Samodovitz

(57) ABSTRACT

In a call center with automatic answering, the availability of an agent is verified in order to prevent open connections when the agent unexpectedly leaves his or her station and fails to give proper notice. Verification may be provided by sensing speech activity of the agent when greeting a calling party or in response to an incoming-call signal. In other embodiments, verification may be provided by checking an audio device allocated to the agent, for example checking whether the agent is wearing his or her headset, or whether the headset is operably connected to the call center.

4 Claims, 5 Drawing Sheets

METHOD FOR PROCESSING CALLS IN A CALL CENTER WITH AUTOMATIC ANSWERING

FIELD OF THE INVENTION

The present invention applies to the field of telecommunication, and more particularly to a method for answering calls incoming to a telephone call center.

BACKGROUND

Telephone call centers are now widely used to provide services in both the commercial and governmental sectors. A commercial enterprise may use a call center to take orders, arrange appointments, provide warranty registration or help-desk advice, and the like. A governmental office may use a call center to coordinate requests from citizens for emergency services such as fire fighting or police intervention. Such commercial enterprises and governmental offices may own and manage their own proprietary call centers, or they may contract the services of vendors who specialize in call centers.

Timeliness in answering incoming calls often has acute importance, as is self evident in the case of emergency calls to police departments. Further, the terms of contracts between commercial enterprises and call center vendors often specify average or maximum times that incoming calls may not exceed while lingering in a call center queue before being answered by an agent.

Timeliness specifications may be transgressed when an agent leaves his or her call center station without giving proper notice, which notice requires overt action by the agent to inform the call center routing algorithm that the agent will be unavailable. Calls continue to be routed to that agent despite his or her absence. In manual-answer call centers, these calls go unanswered, of course, and increase the average-time-to-answer for the call center. In principle, such unanswered call may also violate maximum-time-to-answer specifications. In practice, they always annoy customers and clients; in the extreme, they may have dire consequences when emergencies are involved. To minimize the increase in average-time-to-answer in manual-answer call centers, and to satisfy maximum-time-to-answer specifications, calls that are not answered after a predetermined number of rings are returned to queue, to be assigned to another agent.

In contrast to a manual-answer call center, an automatic-answer call center does not ring calls to agents. Instead, an automatic-answer call center, which is sometimes called a forced-answer call center, selects an agent on record as being available, assigns a call from the queue to the agent, and automatically answers the call for the agent (i.e., establishes a connection between the agent and the calling party automatically). Relative to manual call answering, automatic call answering provides a better average-time-to-answer for call centers, and provides more responsive service to callers.

When an agent leaves his or her station in an automatic-answer call center without giving proper notice, however, an incoming call may still be routed to the agent and answered automatically, even though the agent is not actually present to serve the calling party. When this happens, an unchecked open connection is established. The open connection has all the adverse consequences of an open connection in a manual-answer call center. Unlike a manual-answer call center, however, an automatic-answer call center has no way of minimizing the damage caused by such an open connection by returning the call to queue.

Thus there is a need to provide a method for processing calls in call centers with automatic answering that preserves the responsiveness of automatic call answering, but which also provides the return-to-queue safeguards of manual call answering.

SUMMARY

The present invention provides a method for processing calls in call centers with automatic answering that offers both the responsiveness of automatic call answering and the return-to-queue safeguards of manual call answering.

In one embodiment, an agent is alerted to an incoming call by a signal, for example by a zip tone or a whisper command, which the agent is expected to respond to orally. A speech processor then checks for responsive speech activity. If responsive speech activity of the agent is detected, the agent is presumed to be available for the call, in which case the call is answered automatically for the agent. If responsive speech activity is not detected, the agent is presumed to be unavailable, and the call is returned to queue for servicing by another agent.

In another embodiment, a call is assigned to an agent and answered automatically. A speech processor then checks for speech activity following the automatic answering of the call, for example the speech activity that is expected to occur when the agent greets the calling party. If responsive speech activity of the agent is detected, the agent is presumed to be available. If responsive speech activity is not detected, the agent is presumed to be unavailable, and the call is returned to queue for servicing by another agent.

In still another embodiment of the invention, the call center checks an audio device allocated to the agent in order to determine whether the agent is available. For example, the check may ascertain whether the agent is wearing a headset, and is therefore presumably available for an incoming call, or may ascertain whether the headset is operably connected to the call center. If the agent is determined to be available, the call is assigned to the agent and answered automatically. If the agent is determined to be unavailable, the call is returned to queue for servicing by another agent.

In yet another embodiment of the invention, an incoming call is assigned to an agent and answered automatically. The call center then checks an audio device allocated to the agent in order to determine whether the agent is available, as described above. If the agent is determined to be unavailable, the call is returned to queue for servicing by another agent.

These and other aspects of the invention will be more fully appreciated when considered in light of the following drawings and detailed description.

DETAILED DESCRIPTION

The present invention provides a method for processing calls in call centers with automatic answering that preserves the responsiveness of automatic call answering, but which also provides the return-to-queue safeguards of manual call answering.

Figure 1:
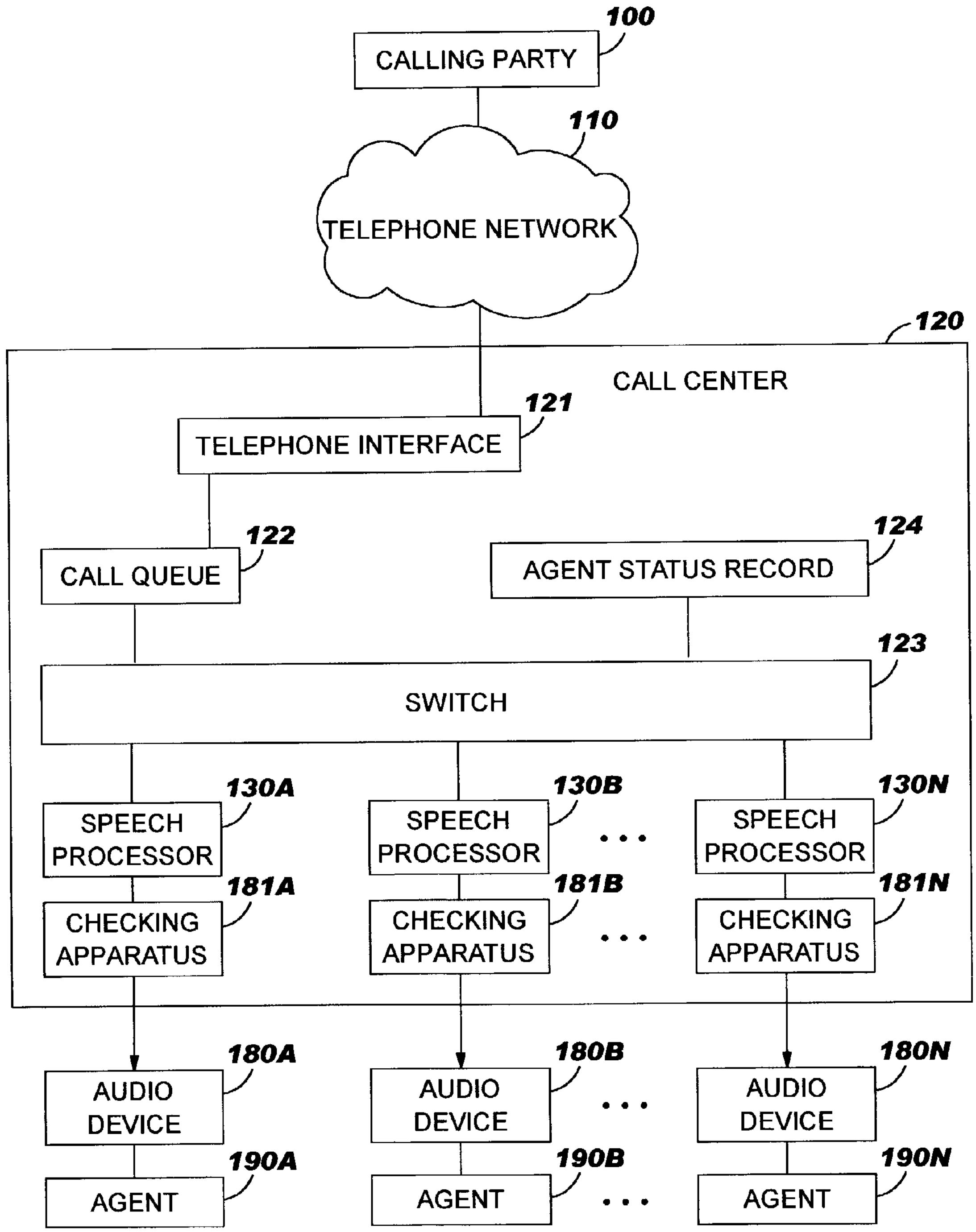
FIG. 1 is a block diagram that shows an exemplary call center configuration according to the present invention.

FIG. 1 shows an exemplary call center configuration according to the present invention. The configuration of FIG. 1 is illustrative rather than limiting of the invention, however, and is intended to serve as a vehicle for the discussion of the inventive method that follows.

As shown in FIG. 1, a calling party 100 may access a call center 120 over a telephone network 110. The telephone network 110 may be a conventional wireline public switched telephone network. The invention is not limited in this way, however, and applies as well when other kinds of networks are employed, including voice-over-IP networks, cellular telephone networks, satellite networks, emergency networks, private corporate networks, and the like.

The call center 120 includes a telephone interface 121 to the telephone network 120. Incoming calls are accepted by the telephone interface 121 and recorded in a call queue 122 while awaiting service. Agents 190A–190N are available to the call center 120 to service the call from the calling party 100, and the call center 120 selects agents to service the queued calls. If an agent is available when an incoming call arrives, the incoming call may be noted in the call queue 122, but need not linger before being serviced—it is not necessary that every call literally be queued. A switch 123 connects the telephone interface 121 to the agents 190A–190N so that the agents 190A–190N can service calls, and selects agents and routes calls to the selected agents according to the occupancy of the call queue 122 and the status of the agents 190A–190N.

Status of the agents 190A–190N is kept by an agent status record 124. When an agent is known to be busy servicing a call, or when the agent has given proper notice of unavailability, the status of that agent is listed as “unavailable” in the agent status record 124. At the end of a call, or upon receiving notice that an agent has returned to his or her station after an absence, the status of that agent is changed to “available” in the agent status record 124.

As shown in FIG. 1, speech processors 130A–130N may be connected to the agent-side ports of the switch 123, so that the speech processors 130A–130N may process speech received from the agents 190A–190N. The speech processors 130A–130N may include speech recognition capabilities, speaker recognition capabilities, energy detectors, threshold activity detectors, and so forth, according to particular embodiments of the invention.

The agents 190A–190N are allocated audio devices 180A–180N, for communication with the agent-side ports of the switch 123. The audio devices 180A–180N may be, for example, microphones, earphones or other earpieces, headsets each having an earphone and a microphone, and the like. Connections between the audio devices 180A–180N and the switch 123 may be wired and/or wireless. A wireless connection may be supported by a pair of wireless transceivers—an agent-side transceiver connected to the associated audio device, and a switch-side transceiver connected to the switch 123.

The audio devices 180A–180N may be monitored by checking apparatus 181A–181N as shown in FIG. 1, which may be used according to various embodiments of the invention, as explained further below, to verify that an agent listed as available in the agent status record 124 is actually present and able to service a call, has not departed from his or her station without giving proper notice, and does not have a faulty audio device. For convenience, FIG. 1 shows the checking apparatus 181A–181N as being internal to the call center 120 cabinet. This is illustrative rather than limiting, however, as the checking apparatus 181A–181N may be located as well with the audio devices 180A–180N, or may be partly located within the call center 120 cabinet and partly located with the audio devices 180A–180N.

When the audio device 180A allocated to agent 190A has a wireless connection with the switch 123, the checking apparatus 181A for the audio device 180A may measure a characteristic of a wireless signal received by the switch-side transceiver that supports the wireless connection. The agent 190A may be presumed to have left his or her station or to have faulty equipment (for example, the agent-side transceiver may have failed) when signal strength falls below a predetermined level, when bit-error or frame-error rates exceed predetermined levels, when bit or frame synchronization is lost, and so forth.

A number of ways may be employed to check the audio device 180A when the connection between the switch 123 and the audio device 180A is wired. For example, the physical connection may employ a jack having a switch that is operated by inserting a phone plug into the jack. If the state of the switch indicates that the plug is not inserted into the jack, the agent 190A may be presumed to be away form his or her station, or to have faulty equipment (for example, the fault may lie in improper insertion of the plug into the jack). In this example, the checking apparatus 181A may be circuitry that determines the state of the switch.

Other kinds of checking apparatus 181A–181N may measure properties of the agents 190A–190N, to determine whether the agents 190A–190N are actually in physical possession of the audio devices 180A–180N. For example, a spring-loaded support used to position and hold a headset on an agent’s head may include a switch that is activated when the spring is flexed to allow the agent to place the headset on the head, so that the switch indicates whether the agent is wearing the headset. In other cases, a headset may include equipment for sensing changes in temperature, impedance, or capacitance that occur when the headset is put on or when the agent is wearing the headset, or for detecting motion or particular orientations when the headset is worn or put on, or when a microphone boom is extended from a retracted position for use, and so forth.

It is not necessary that embodiments of the invention use both the speech processors 130A–130N and the checking apparatus 181A–181N, although some embodiments may use both. Rather, some embodiments of the invention do not rely upon the checking apparatus 181A–181N, whereas other embodiments do not rely upon the speech processors 130A–130N.

Figure 2:
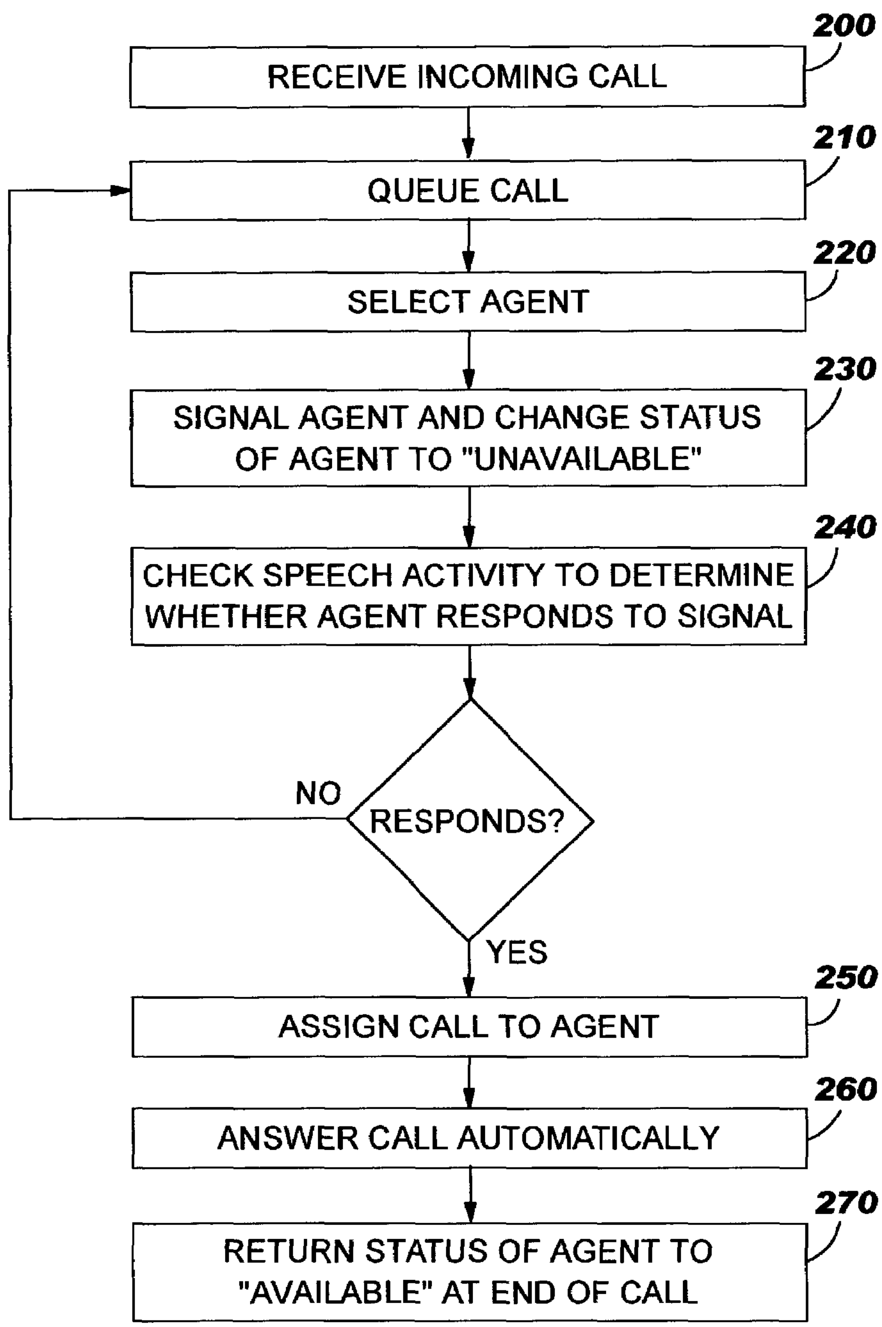
FIG. 2 is a flow chart that shows aspects of a method according to the invention for processing calls wherein an agent is signaled before a call is answered automatically.

FIG. 2 shows aspects of a method according to the invention for processing calls, wherein an agent is signaled before a call is answered automatically for the agent. As shown in FIG. 2, the call center 120 receives an incoming call from the calling party 100 (step 200). The call is recorded in the call queue 122 to await an available agent (step 210). The switch 123 selects an agent whose status is listed as "available" in the agent status record 124, for example the agent 190A, to service the call (step 220). The status of the selected agent 190A is changed to "unavailable" in the call status record 124, and the selected agent 190A is signaled (step 230). Signaling may be, for example, by a whisper command or a zip tone, as mentioned above.

The speech processor associated with the selected agent, for example speech processor 130A associated with the selected agent 190A, then checks for speech activity to determine whether the selected agent 190A responds to the signal (step 240). In one embodiment of the invention, the speech processor 130A may include speech recognition apparatus that recognizes at least one word spoken by the selected agent 190A in response to the signal. For example, the signal might be a whisper command "incoming call," to which the agent would respond either "ready" or "no," which responses would be distinguished by the speech processor 130A and acted on accordingly by the call center 120. In other embodiments, the speech processor 130A may determine the presence or absence of speech activity by the selected agent 190A, for example by measuring the electrical signal generated by the speech of the selected agent 190A to determine its energy, amplitude, spectral components, or any other property whose presence or absence is indicative of the presence or absence of speech.

If the speech processor 130A determines that the agent 190A is not ready to accept the incoming call, as indicated by the recognized response of the selected agent 190A or by the absence or presence of electrical signals indicating speech activity, the call is again put in queue (step 210), i.e., returned to queue. Otherwise (i.e., the speech processor 130A determines that the agent 190A is ready to accept the incoming call), the call is assigned to the selected agent 190A for servicing (step 250), and the call is answered automatically for the agent (step 260). At the end of the call, the status of the agent 190A is changed to "available" in the agent status record 124, indicating that the agent 190A may take another incoming call (step 270).

Figure 3:
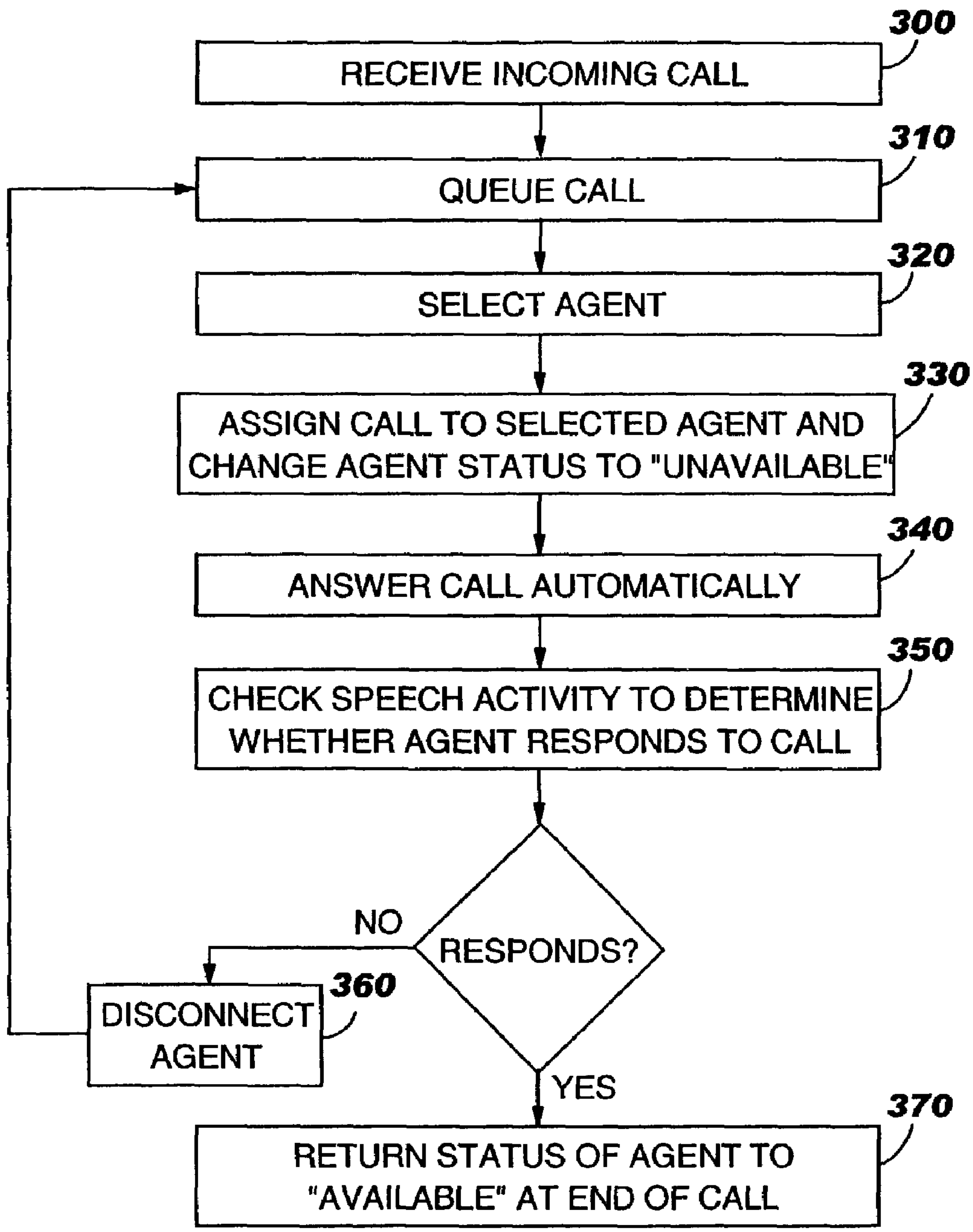
FIG. 3 is a flow chart that shows aspects of a method according to the invention for processing calls wherein a call is answered automatically without explicit signaling.

FIG. 3 shows aspects of a method according to the invention for processing calls wherein a call is answered automatically without explicit signaling. As shown in FIG. 3, the call center 120 receives an incoming call from the calling party 100 (step 300). The call is recorded in the call queue 122 to await an available agent (step 310). The switch 123 selects an agent whose status is listed as "available" in the agent status record 124, for example the agent 190A (step 320). The call is assigned to the selected agent 190A, and the status of the selected agent 190A is changed to "unavailable" in the call status record 124 (step 330). The call is then answered automatically for the selected agent 190A (step 340).

Once the call is answered, the speech processor associated with the selected agent 190A, for example speech processor 130A associated with the selected agent 190A, then checks for speech activity to determine whether the selected agent 190A responds to the call (step 350). In one embodiment of the invention, the speech processor 130A may include speech recognition apparatus that recognizes at least one word spoken by the selected agent 190A addressed to the calling party 100, for example a word in a phrase used by the agent 190A to greet the calling party 100. In other embodiments, the speech processor 130A may determine the presence or absence of speech activity by the selected agent 190A, for example by measuring the electrical signal generated by the speech of the selected agent 190A to determine its energy, amplitude, spectral components, or any other property whose presence or absence is indicative of the presence or absence of speech.

If the speech processor 130A determines that the selected agent 190A is not responsive to the incoming call, the agent 190A is disconnected (step 360), and the call is again put in queue (step 310), i.e., returned to queue for assignment to another agent. Otherwise (i.e., the speech processor 130A determines that the agent 190A is responsive to the call), the connection with the selected agent 190A is maintained until the call ends, at which time the status of the agent 190A is changed to "available" in the agent status record 124, indicating that the agent 190A may take another incoming call (step 370).

Figure 4:
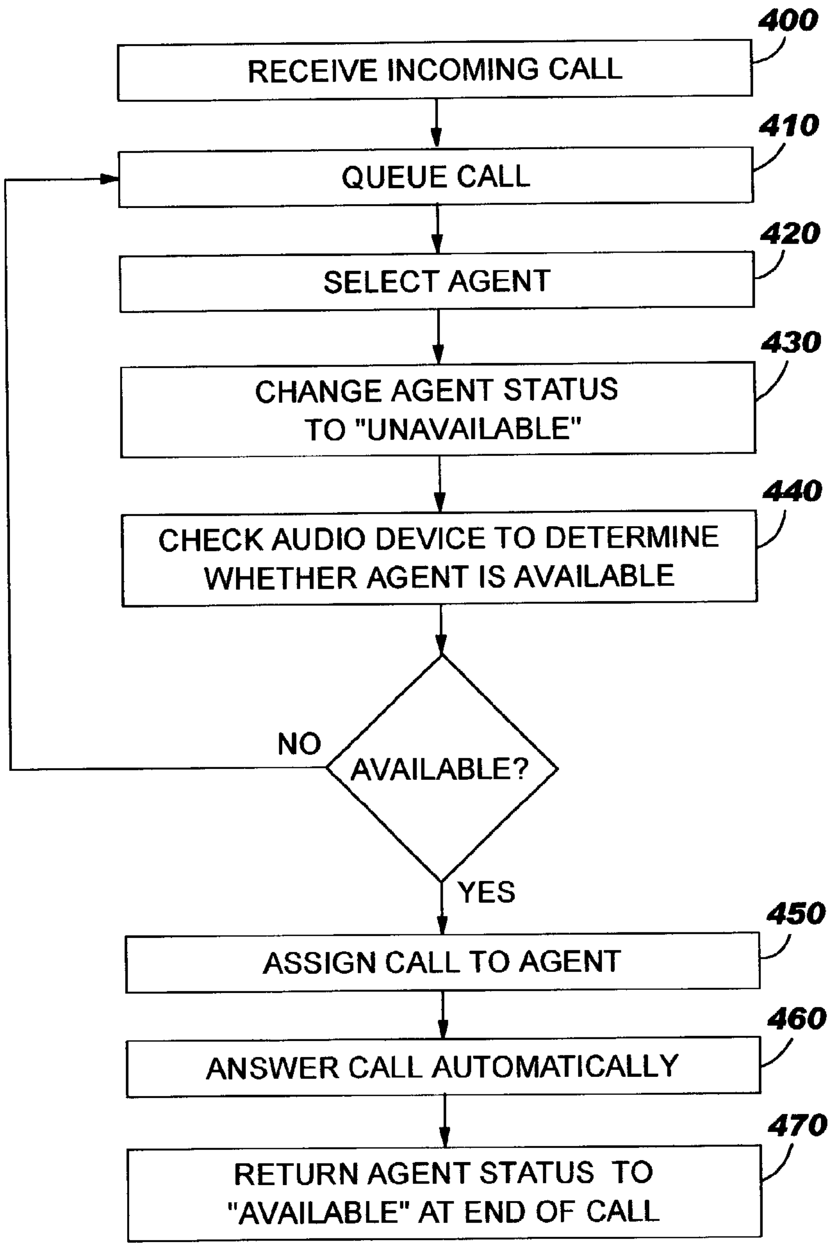
FIG. 4 is a flow chart that shows aspects of a method according to the invention for processing calls wherein an audio device allocated to an agent is checked to verify the presence of the agent before a call is answered automatically.

FIG. 4 shows aspects of a method according to the invention for processing calls wherein an audio device assigned to an agent (for example, a headset) is checked to verify the presence of the agent before a call is answered automatically. As shown in FIG. 4, the call center 120 receives an incoming call from the calling party 100 (step 400). The call is recorded in the call queue 122 to await an available agent (step 410). The switch 123 selects an agent whose status is listed as "available" in the agent status record 124, for example the agent 190A, to service the call (step 420). The status of the selected agent 190A is changed to "unavailable" in the call status record 124 (step 430).

The audio device 180A allocated to the selected agent 190A is then checked, using the checking apparatus 181A associated with the audio device 180A, to determine whether the selected agent 190A is available to respond to the incoming call (step 440). As explained above, this determination may be based on measurements of a signal characteristic of a wireless transceiver; proper seating of an audio plug into a jack; headset sensor data including the state of status switches, motion or orientation detectors; properties of the selected agent 190A such as body temperature, impedance or capacitance to ground or across a headset; and so forth.

If the checking apparatus 181A determines that the agent 190A is not available to respond to the incoming call, the call is again put in queue (step 410), i.e., returned to queue. Otherwise (i.e., the checking apparatus 181A determines that the agent 190A is available to accept the incoming call), the call is assigned to the selected agent 190A for servicing (step 450), and the call is answered automatically for the agent 190A (step 460). At the end of the call, the status of the agent 190A is changed to "available" in the agent status record 124, indicating that the agent 190A may take another incoming call (step 470).

Figure 5:
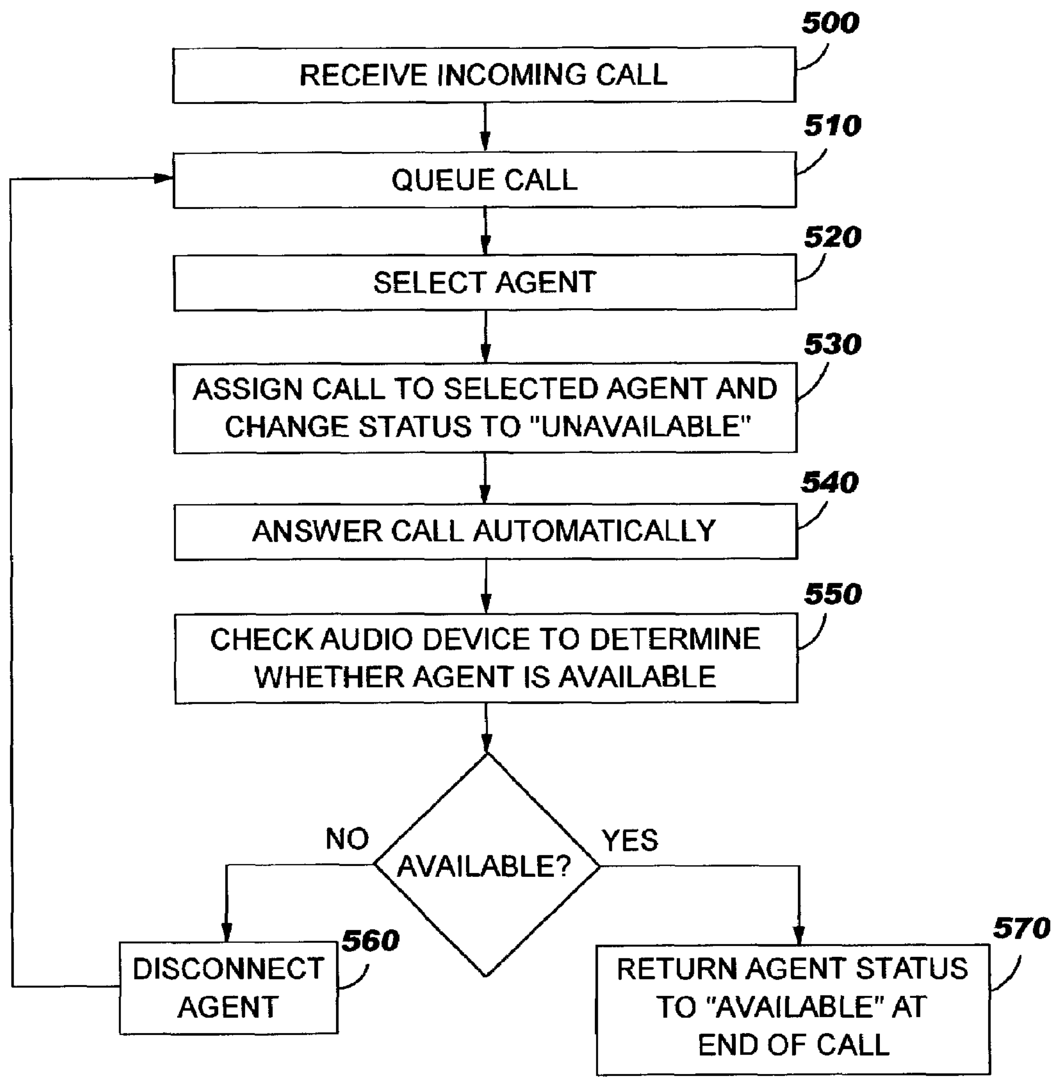
FIG. 5 is a flow chart that shows aspects of a method according to the invention for processing calls wherein a call is automatically answered and an audio device allocated to an agent is checked to verify the presence of the agent after the call is answered automatically.

FIG. 5 shows aspects of a method according to the invention for processing calls wherein a call is automatically answered for an agent, and an audio device allocated to the agent (for example, a headset) is then checked to verify the presence of the agent after the call is answered. As shown in FIG. 5, the call center 120 receives an incoming call from the calling party 100 (step 500). The call is recorded in the call queue 122 to await an available agent (step 510). The switch 123 selects an agent whose status is listed as "available" in the agent status record 124, for example the agent 190A, to service the call (step 520). The call is assigned to the selected agent 190A, and the status of the selected agent 190A is changed to "unavailable" in the call status record 124 (step 530). The call is then answered automatically for the agent (step 540).

Once the call is answered, the audio device 180A allocated to the selected agent 190A is then checked, using the checking apparatus 181A associated with the audio device 180A, to determine whether the selected agent 190A is available to respond to the incoming call (step 550). As explained above, this determination may be based on measurements of a signal characteristic of a wireless transceiver; proper seating of an audio plug into a jack; headset sensor data including the state of status switches, motion or orientation detectors; properties of the selected agent 190A such as body temperature, impedance or capacitance to ground or across a headset; and so forth.

If the checking apparatus 181A determines that the agent 190A is not available to respond to the incoming call, the selected agent 190A is disconnected (step 560), and the call is again put in the call queue (step 510), i.e., returned to queue for assignment to another agent. Otherwise (i.e., the checking apparatus 181A determines that the agent 190A is available to respond to the incoming call), the connection with the selected agent 190A is maintained until the call ends, at which time the status of the agent 190A is changed to "available" in the agent status record 124, indicating that the agent 190A may take another incoming call (step 570).

From the preceding description, those skilled in the art will now appreciate that the present invention provides a method for processing calls in call centers with automatic answering that offers both the responsiveness of automatic call answering and the return-to-queue safeguards of manual call answering. The foregoing description is illustrative rather than limiting, however, and the invention is limited only by the claims that follow.

We claim:

1. A method for processing calls in a call center with automatic answering, comprising the steps of:

signaling an agent with a signal on a called side of an incoming call;

determining whether the agent responds orally to the signal by checking for speech activity of the agent on the called side; and if the agent responds to the signal on the called side, answering an incoming call automatically for the agent.

2. The method of claim 1, wherein the signal is a whisper command.

3. The method of claim 1, wherein the signal is a zip tone.

4. The method of claim 1, wherein the step of determining whether the agent responds orally to the signal by checking for speech activity includes the step of recognizing at least one word spoken by the agent.

* * * * *